United States Patent
Marshall et al.

(10) Patent No.: US 7,328,399 B2
(45) Date of Patent: Feb. 5, 2008

(54) SYNCHRONOUS SERIAL DATA COMMUNICATION BUS

(75) Inventors: Kenneth R. Marshall, Nampa, ID (US); Jan S. Wesolowski, Redwood City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 981 days.

(21) Appl. No.: 10/213,697

(22) Filed: Aug. 6, 2002

(65) Prior Publication Data

US 2004/0059965 A1  Mar. 25, 2004

(51) Int. Cl.
*G06F 7/02* (2006.01)
(52) U.S. Cl. ...................................... 714/821
(58) Field of Classification Search ................ 714/821, 714/822, 824, 804, 758, 750, 729, 730; 710/3, 710/110, 305; 370/246, 452
See application file for complete search history.

(56) References Cited

U.S. PATENT DOCUMENTS

| | | | |
|---|---|---|---|
| 4,314,334 A * | 2/1982 | Daughton et al. ............. | 710/3 |
| 5,283,781 A * | 2/1994 | Buda et al. ................. | 370/246 |
| 5,361,260 A * | 11/1994 | Mito ........................... | 370/452 |
| 5,453,737 A * | 9/1995 | Opoczynski ................. | 340/2.8 |
| 5,566,193 A * | 10/1996 | Cloonan ..................... | 714/802 |
| 5,815,660 A * | 9/1998 | Momona .................... | 709/208 |
| 6,557,063 B1 * | 4/2003 | Wang et al. ................ | 710/110 |
| 6,598,107 B1 * | 7/2003 | von der Wense et al. ... | 710/305 |

OTHER PUBLICATIONS

The I²C-Bus and How to Use it (Including Specifications), Phillips Semiconductors, Apr. 1995, pp. 1-24.
Microwire™ Serial Interface, National Semiconductor Corporation, 1995, pp. 1-11.
Norbert Nölker et al., Interfacing Slow Peripherals to D. Modules via SPI. Doc#1.0, Application Note, D. SignT, Digital Signalprocessing Technology, 1999, pp. 1-9.

* cited by examiner

*Primary Examiner*—Guy Lamarre
*Assistant Examiner*—Fritz Alphonse
(74) *Attorney, Agent, or Firm*—Townsend and Townsend and Crew LLP

(57) ABSTRACT

A synchronous serial bus features a variable data size format and an in-line addressing and data architecture. Flexible addressing allows for a variety of slave devices and configurations. Frequent parity checking during a transaction allows for faster error recovery. Repeater devices connect multiple slaves to the master using only point-to-point physical connections, thus providing multidrop architecture while at the same time ensuring excellent signal integrity and allowing a very high speed operation.

14 Claims, 7 Drawing Sheets

BUS TOPOLOGY

SYNCHRONOUS SERIAL DATA COMMUNICATION BUS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention is generally related to data communications and in particular to synchronous serial communications.

Generally, serial communication of data requires coordination between a sender and a receiver. For example, typically it is necessary to know when to start a transmission and when to end it, when an error occurs, when a receiver's capacity has been exceeded, and so on. Serial data transfers depend on accurate timing in order to differentiate the bits in the data stream. This timing can be achieved in one of two ways: asynchronously or synchronously.

Synchronous communication takes place between the sender and receiver operating on synchronized clocks. The clock signal for the transmission line is typically derived from the signal used for clocking internal operations of the transmitting device. That clock, in turn, is typically provided by an external oscillator; but, sometimes, it may be generated by the transmitting device's internal oscillator.

Synchronization between transmitter and receiver may be achieved either by providing both of them with a common clock coming from an external source or by passing the clock timing information from the transmitter to the receiver. In the simplest form, passing the clock timing between transmitter and receiver may be accomplished by sending the clock over a dedicated clock line. Often, the receiver uses this clock directly for clocking the received data into its registers. If this is the case, the clock and the data signals do not have to follow any periodic timing—the only requirement is that the data signal is stable around the time when the receiver, directed by the clock, is sampling it.

Alternatively, the receiver uses the provided clock as a reference signal for its internal phase-locked loop which generates the receive clock.

In a more complex form, the transmit clock timing may be embedded in the transmitted data. The receiver uses the data as a reference signal for a phase-locked loop which generates the receive clock. Such a solution typically involves special coding of data which guarantees that, independent of the data content, the frequency of the data signal level transitions never falls below a certain minimum which is needed for proper operation of the phase-locked loop.

As the name implies, asynchronous communication is performed between two (or more) devices which operate on independent clocks. Therefore, even if the two clocks agree for a time, there is no guarantee that they will continue to agree over extended periods. Yet, for data communication with no errors, the communicating devices must guarantee that when device A begins and ends transmitting, device B begins and ends receiving. The receiving device alone must determine the best time to sample the incoming data signal, based on its own clock and level transitions detected in the incoming data. Consequently, asynchronous communication is typically relegated to slow speed devices.

By contrast, synchronous communication, although more complicated to implement by virtue of the requirement of a synchronized clock, can achieve higher data rates and more efficient data transfers by sending data as large blocks of information. It is therefore desirous to continue improving synchronous data communication techniques.

BRIEF SUMMARY OF THE INVENTION

In accordance with the present invention a serial data communication method and system comprises point-to-point physical connection of sending and receiving devices. A repeater device allows for multidrop topologies while at the same time preserving the advantage of point-to-point physical connections. Communication includes transmitting address information and data and multiple error checking information in an interleaved manner. This allows for quicker detection of errors and faster error recovery.

BRIEF DESCRIPTION OF THE DRAWINGS

The features and advantages of the present invention will be more clearly understood from the following description taken in conjunction with the accompanying drawings in which.

DETAILED DESCRIPTION OF THE INVENTION

Figure 1:
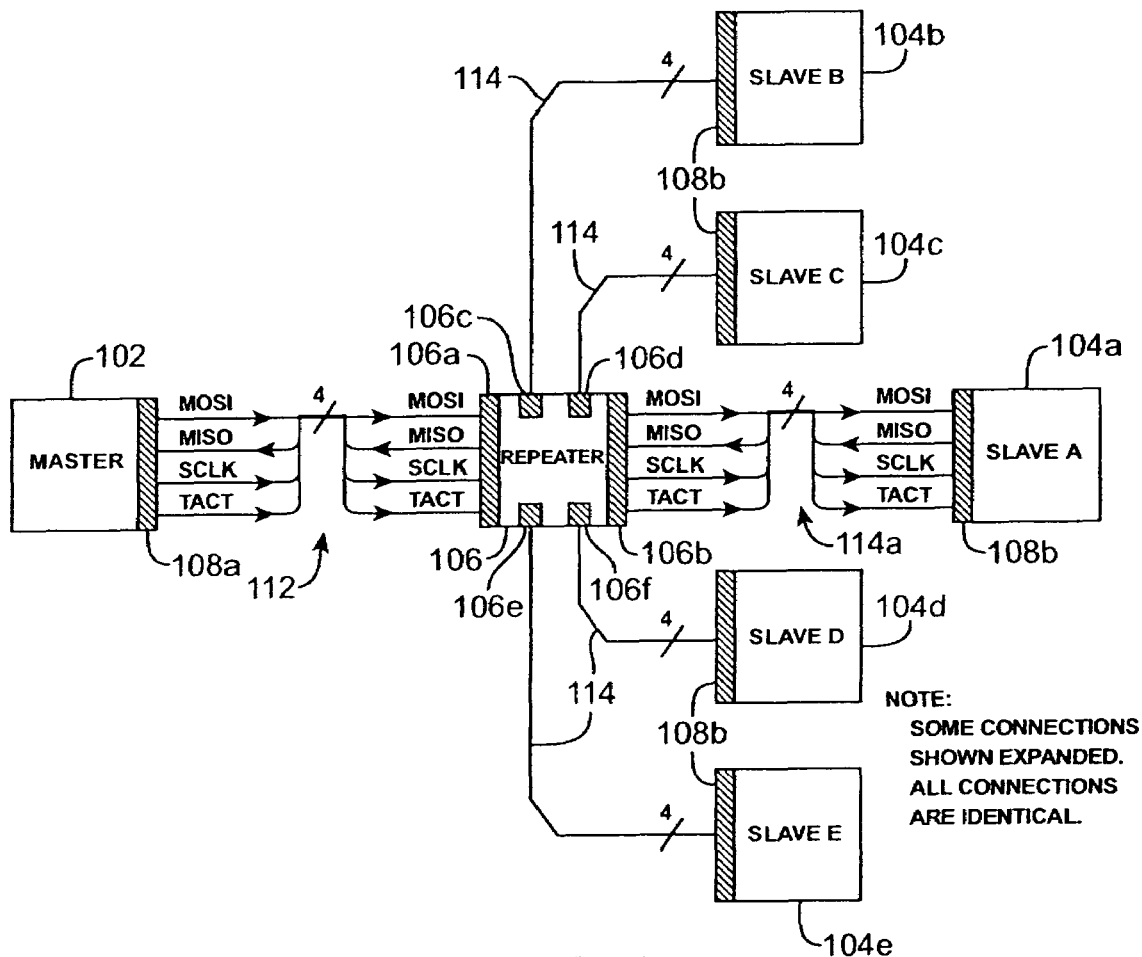
FIG. 1 shows a high level diagram of a serial bus topology in accordance with an embodiment of the invention.

FIG. 1 shows an illustrative configuration of an embodiment of a synchronous serial interface bus in accordance with the present invention. The synchronous serial interface bus allows 8, 16, or 32-bit data transfers between a single master 102 and each of one or more slaves, e.g. 104a, 104b, 104c, 104d, and 104e. The expanded views of the serial bus 112, 114a show the following four signal lines:

1. Master Out/Slave In (MOSI) line, over which bus master transmits data to the slaves;
2. Master In/Slave Out (MISO) line, over which the bus master receives data from the slaves;

3. Clock (SCLK) line, carrying a continuous square wave provided by the master for clocking slave interfaces; and
4. Transaction Active (TACT) line, driven by the master, indicating start, progress, and completion or abort of a data transfer transaction on the bus.

Conventionally, the signal lines which constitute the data communication paths between the devices are standard single-ended transmission lines. However, it can be appreciated that other signaling media can be used. For example, those of ordinary skill can readily adapt the various aspects of the present invention in a configuration based on differential transmission lines or wireless technology.

The master device 102 includes bus interface logic 108a for providing and sensing signals on the serial bus 112. Similarly, each slave device 104a-104e includes bus interface logic 108b for electrical connection and operation on the serial buses 114. The bus logic 108a, 108b provide appropriate electrical interfacing (e.g., line drivers), and suitable signal generation and signal detection logic for serial communication in accordance with the present invention. The bus interface logic can be implemented using any of a number of known and understood design techniques, the functionality of which is discussed below.

Figure 2:
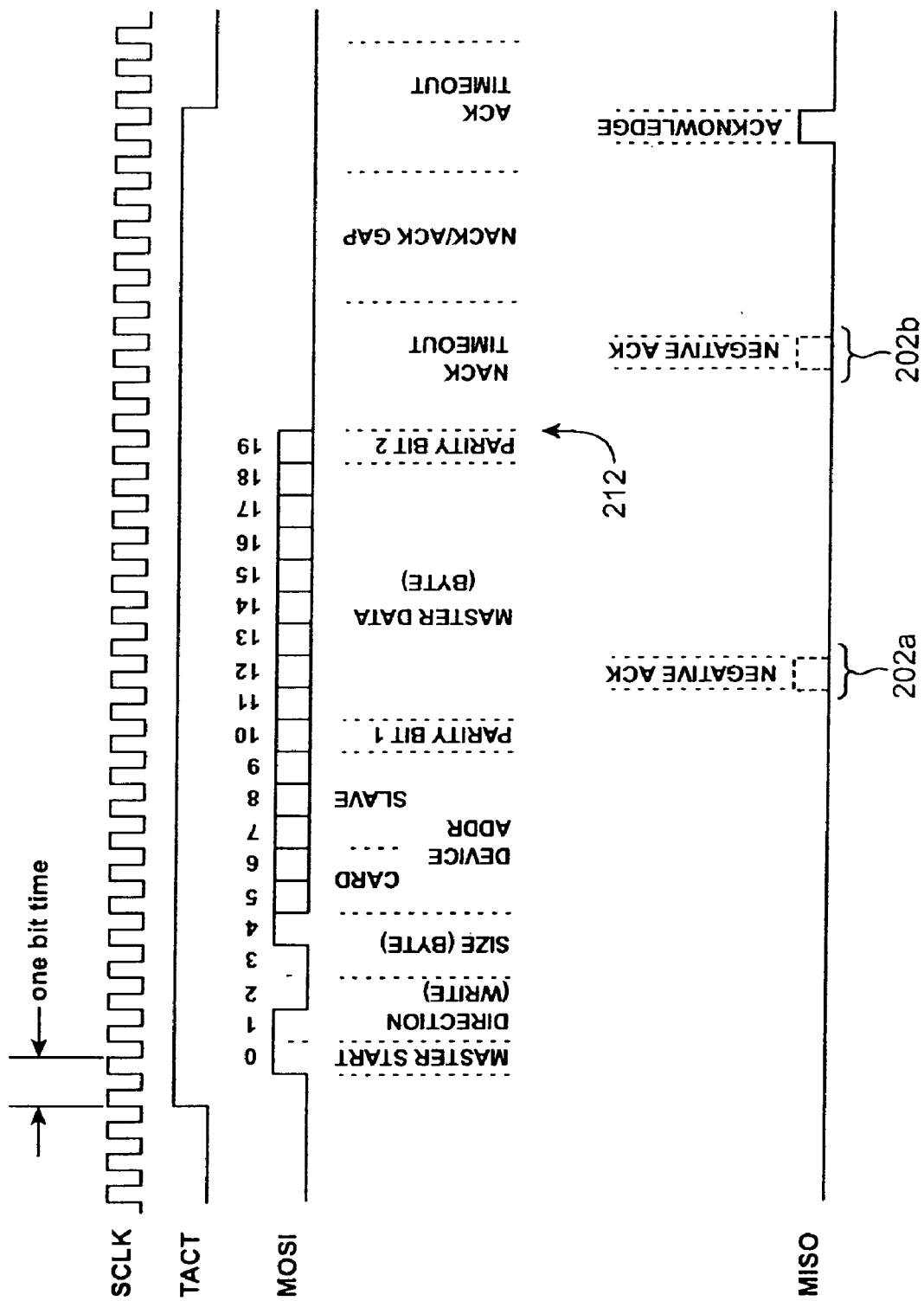
FIG. 2 shows a timing chart for a write transaction of the short format.

In a particular implementation, each time interval between positive-going transitions on the SCLK line constitutes a one-bit time slot (e.g., FIG. 2). It can be assumed without loss of generality that all level transitions follow positive-going transitions on the SCLK line. Thus, in a particular implementation of an illustrative embodiment of the invention, all level transitions of the outputs of the MOSI, MISO and TACT line drivers follow positive-going transitions on the SCLK line.

In a particular implementation, all time intervals between positive-going transitions on the SCLK line and, hence, the corresponding one-bit time slots are equal (i.e., the clock signal is periodic), and the SCLK signal is a square wave. It can be appreciated, however, that operation of the synchronous serial bus according to the present invention does not require the clock signal to be a square wave, nor it requires the clock and the bit time slots to be periodic.

In accordance with the invention, there are separate lines for data transfers from master to slaves (MOSI) and from slaves to master (MISO). This allows for simultaneous data transfers in both directions. However, it can be appreciated that the design of the interface logic can be simplified if a convention is adopted that communication occurs in a half-duplex mode, wherein data transmissions happen only during non-overlapping time intervals.

Multiple-bit values are transmitted over the bus with the most significant bit first, and the least significant bit last. Multiple-byte values are transmitted over the bus with the most significant byte first, the least significant byte last. It can be appreciated that implementations with other bit and byte orders are possible.

In a particular implementation, the electrical connections between the devices are point-to-point connections. There is a single connection between the bus interfaces of any two devices. Point-to-point connections allow for proper termination of the transmission line, and avoid signal reflections, signal loading, and other detrimental artifacts due to having multiple devices connected on the same physical line. This provides for electrical signal robustness, and permits higher clock speeds than might be possible using a multidrop architecture.

Figure 1A:
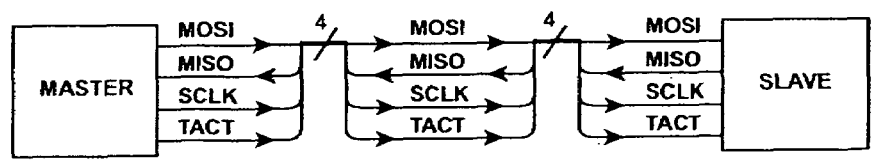
FIG. 1A shows a block diagram of a single-bus topology involving a master device and single slave device.

FIG. 1a shows a simple point-to-point configuration in accordance with the invention, illustrating a master device coupled to a single slave device. However, as shown in FIG. 1, a repeater component 106 can be provided in a configuration wherein a master device 102 is connected to multiple slave devices 104a, 104b, etc. The repeater comprises bus interface circuits 106a-106f, one for connection to each device (master or slave). Thus each connection appears to the device (e.g., the master device) to be a point-to-point connection, providing suitable line termination for the bus lines 112 driven by the master device. The repeater sends its signals to the slave devices through individual buffers, each buffer driving a single slave. The repeater bus interfaces can include logic to restore correct timing relationships of the buffered signals with respect to the bus clock signal (SCLK). The repeater device allows for multidrop topologies while at the same time preserving the advantage of point-to-point physical connections.

In accordance with the invention, data transfer from a slave to the master can only be initiated by the master and, at any time, only one slave may send its data to the master. In one particular implementation, the repeater 106 may have a MISO line selector (e.g., multiplexer) having an input for each slave output line (MISO), and output connected to the master's MISO line. The repeater can include logic for decoding the slave addresses received from the master device and produce a select signal to the multiplexer. In this case, only the signal coming from the addressed slave's line would be passed to the master, further enforcing the simplifying convention that, at any time, only one slave may send its data to the master. Any spurious signals from other slaves' lines would not be permitted to reach the master.

In an alternative, simpler implementation, the logic in the repeater component 106 may collect all the data from the slave devices and merge the data into a single data stream to the master device. Since the slave device "talks" only when permitted by the master device, the logic can simply perform an OR'ing function of the slave output (MISO) lines, the output being the master's input (MISO) line. However, this simple solution is less robust, since it would not prevent spurious signals from non-addressed slaves' lines to reach the master.

As noted above, the repeater component can include logic to reclock the bus signals before sending them out. This may be needed for restoring correct timing relationships with respect to the bus clock.

Transaction Format

In accordance with the present invention, two kinds of transactions are supported by the synchronous serial bus. The particular transaction is dependent on the total length of address required to fully specify the relevant slave register. A "short transaction" (also "short address transaction") is used in all cases in which five bits of address are sufficient to fully specify a slave and its register. The five bits can be divided in any manner suitable for a given configuration, to access registers in a small group of slave devices. This will be discussed further below.

A "long transaction" (also "long address transaction") provides additional addressing bits. In a particular implementation of the bus, 16 additional bits are provided for a total of 21 addressing bits. Long transaction format can be used for transferring data to slave devices having multiple registers, which cannot be fully specified in a five-bit address space. As in the case of short format transactions, the 21 addressing bits can be divided in an manner suitable for a given configuration, to address multiple devices having multiple registers.

The master device 102 initiates long or short transactions based on a knowledge of each particular slave. In addition, each slave can be configured (via its bus interface logic) to receive short transactions or long transactions. Alternatively, the slave can be dynamically reconfigurable, if a particular system calls for such an implementation. It can be appreciated that a suitable combination of logic and software in the master device 102 can be provided which maintains information (whether static or dynamic) about the slave devices and whether they are long or short address devices, and thus initiate long and short transactions according to which device is being accessed.

The remaining discussion is a functional description of data communication between the master device and its associated slave devices in accordance with the serial bus of the present invention.

Figure 6:
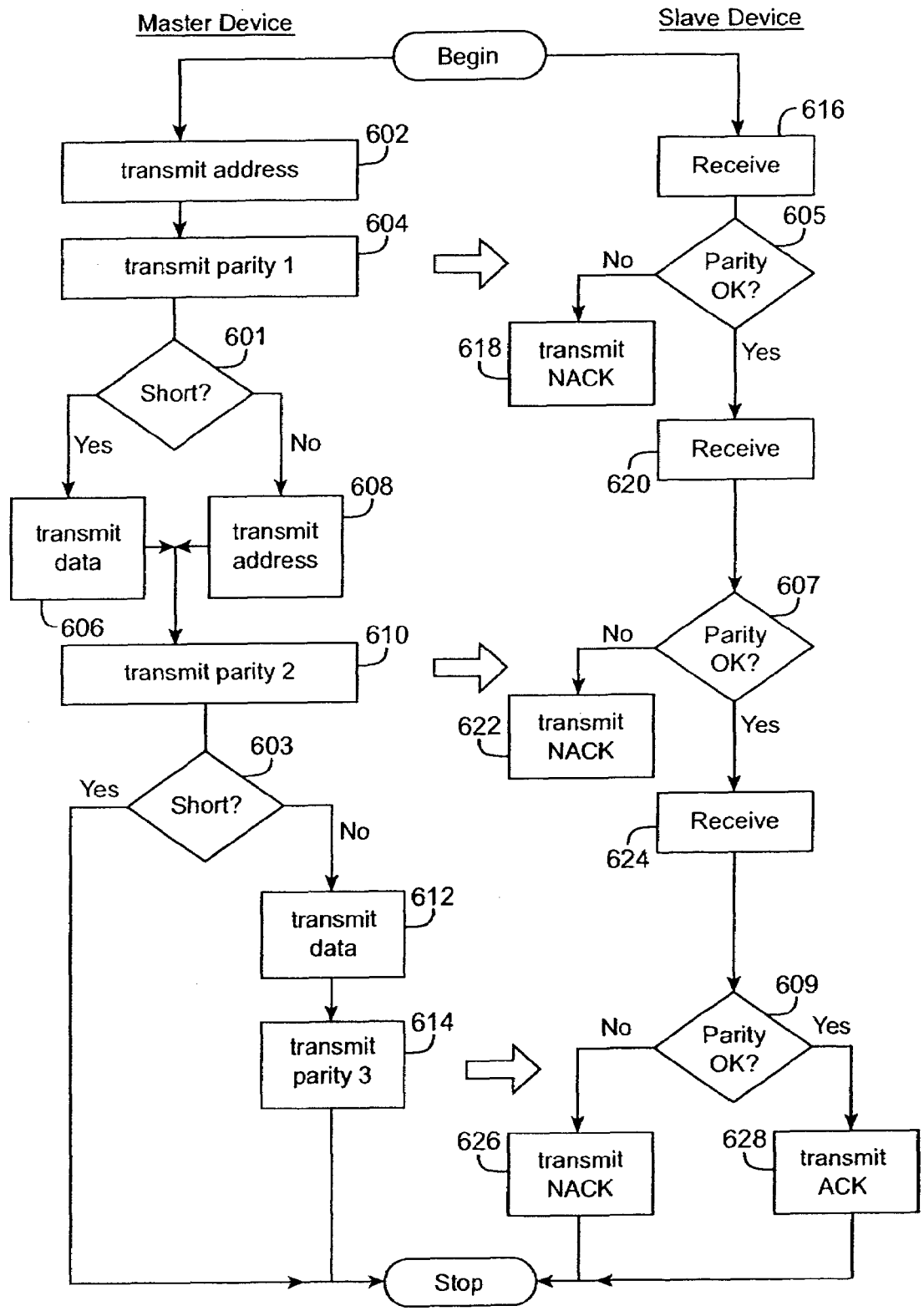
FIG. 6 is a flow diagram highlighting aspects of a write transaction.
Figure 7:
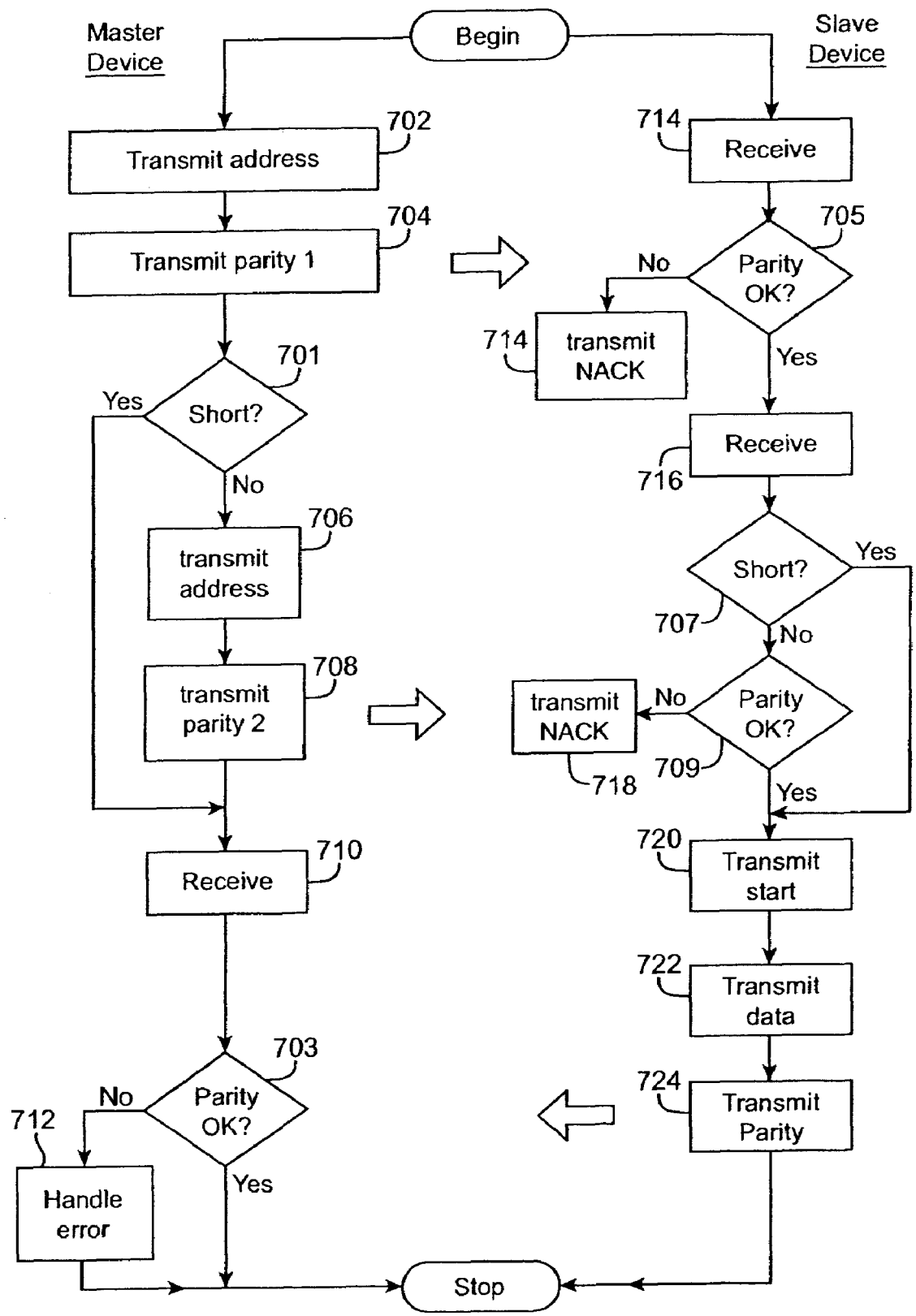
FIG. 7 is a flow diagram highlighting aspects of a read transaction.

Data communication occurs as a series of transactions. Each transaction comprises a portion ("master portion") during which the master transmits to a slave, and a portion ("slave portion") during which the slave sends its response to the master. When the bus is idle, the master drives the TACT line low. If there are any signal transitions on the MOSI and MISO lines in the idle state, the receiving interfaces ignore them. Reference will be made to the timing charts shown in FIGS. 2-5 and the high level flow diagram of FIGS. 6 and 7 highlighting the major steps during the transmission of write and read transactions.

Start Of Transaction

As can be seen in each of the timing charts, the master device 102 begins a transaction by driving the TACT line high. Normally, the line stays high during the entire transaction, covering both, the portion where transmission of data occurs from master to slave and the portion where transmission of data occurs from slave to master. The master can abort the transaction in progress at any time by driving the TACT line low.

The first eleven bits are always sent by the master on the MOSI line.

Bit 0—Master Start

After one or more clock cycles (typically, one) subsequent to asserting the TACT line high, the master drives the MOSI line high for one clock period. This constitutes the Master Start bit, which indicates the start of a contiguous bit stream transmission. The purpose of the Master Start bit is to allow for an unspecified number of clock cycles between the Start Of Transaction and the start of the contiguous bit stream transmission which constitutes the master portion of a transaction. However, typically, this delay is one clock cycle, but can be more than one cycle in a given operating situation.

Bits 2:1—Transfer Direction

With this field, the master indicates the direction of data transfer for the current transaction, namely, write to or read from a slave (the coding being in binary); hence:
00=Reserved
10=Write
01=Read
11=Reserved Bits 4:3—Data Size This field indicates the size of the data (the coding in binary). The presence of this field allows for consecutive transactions to be of varying sizes. In a particular implementation, the following sizes are defined. However, it can be appreciated that additional bits can be provided, and alternate sizes can be defined. Appropriate modifications to the subsequent bit fields (discussed below) can be readily appreciated by those of ordinary skill.
00=8 bits (byte)
01=16 bits (short word)
10=32 bits (long word)
11=Reserved Bits 9:5—Device Address The device address of a slave device is specified by transmitting (step 602, FIG. 6) five bits in a short address transaction. As will be explained, these bits are also used in a long address transaction.

In the case of a short transaction, 32 registers can be addressed. However, in accordance with the invention, the address bits can have any structure suitable for a particular application. For example, the five bits can be structured as two bits for addressing a specific device (one of four) and the remaining three bits can be used to address one of eight registers in the addressed device. It can be appreciated that other addressing structures are possible. As another example, the implementations indicated in FIGS. 2-5 assume a configuration comprising "cards," each containing multiple slave devices:

Bits 6:5—First level: These bits represent a card address or slave device group address, of a unit containing multiple slave devices.

Bits 9:7—Second level: These bits address a particular slave device (possibly a single register device) within the card or group identified by Bits 6:5.

Bit 10—Parity bit 1

The master device transmits (step 604) a Parity bit 1. This is an odd parity bit covering bits 1 through 9. It is a parity bit associated with the address field, thus providing detection for errors that might occur in this field. While a single bit is used, it can be appreciated that two or more parity bits may be more suitable.

In accordance with the invention, detection of a parity error by a slave interface should result in the slave asserting a negative acknowledge (NACK) signal to the master. For example, FIG. 2 shows where a NACK 202a, 202b might occur during transmission by the master (the pulses are shown in phantom). The slave transmits a NACK by pulling the MISO line high for one clock cycle as soon as possible, but at latest within a predefined number of clock cycles following the end (212) of the master's portion of the transaction which is called a NACK Timeout. The NACK Timeout chosen for a particular implementation of the invention is eight clock cycles. Thus, for example, the slave device can detect the occurrence of an error in the address data during transmission by the master based on the address and Parity bit 1. If an error is detected, the NACK 202a can be asserted. Similarly, the occurrence of an error in the data portion (MASTER DATA) of the transmission can be detected based on the data portion and the Parity bit 2, in response to which NACK 202*b* can be asserted. Thus, errors can be detected sooner than with conventional serial communication schemes.

The master treats the NACK signal as a transaction abort request. As a result, the master should abort the current transaction and drive the TACT line low. After that, it should issue an interrupt to the CPU controlling the master interface. The cause of the interrupt should be represented in the contents of an interrupt cause register. The program executed by the CPU should perform an action designed to handle such an error situation. The details of the interrupt lines, registers and interrupt handling can be understood by those of ordinary skill in the art and are not germane to the present invention.

The remaining discussion is directed to the write and read transactions, of the long and short format.

Write Transaction

During a write transaction, the master transfers data to a selected register in a slave device.

Write—Transmission from Master to Slave

The following bit fields are defined for write transactions, including short address (FIG. 2) and long address (FIG. 3) transactions.

Bits 42:11 or 26:11 or 18:11 (Dependent on Data Size)—Master Data or Extended Address These bits have dual use: If the master device determines (step 601) that a short transaction (e.g., FIG. 2) should be sent, then it will transmit data as Bits 42:11 or 26:11 or 18:11 (step 606) to the slave device. The length of this data field is specified by the data size field (Bits 4:3—8 bits, 16 bits, or 32 bits).

For long transactions, the bits 11-26 serve as an Extended Address field to provide additional addressing bits. Thus, instead of transmitting data, the master device will transmit additional address information on Bits 26:11 (step 608). As with Bits 9:5, the additional bits can be defined with any structure that is suitable for a particular use of the serial bus. For example, 32 devices addressed by Bits 9:5 can be accessed, with each device having 64K registers addressed by Bits 26:11. One can appreciate that suitable logic can be provided to combine Bits 9:5 and Bits 26:11 to obtain 21 bits of address space.

In another embodiment according to the invention, multicast transactions can be supported using the additional bits provided by the Extended Address field. Any of a number implementations are possible. For example, certain bits in the Extended Address field can be reserved for multicasting. The reserved bits can specify groups of devices that are to be the target of a multicast transmission. The slave devices can be designed to recognize transactions carrying multicast addresses as being destined for them; this in addition to those transactions that carry their private addresses.

Bit 43 or 27 or 19 (Dependent on Data Size)—Parity Bit 2

Figure 3:
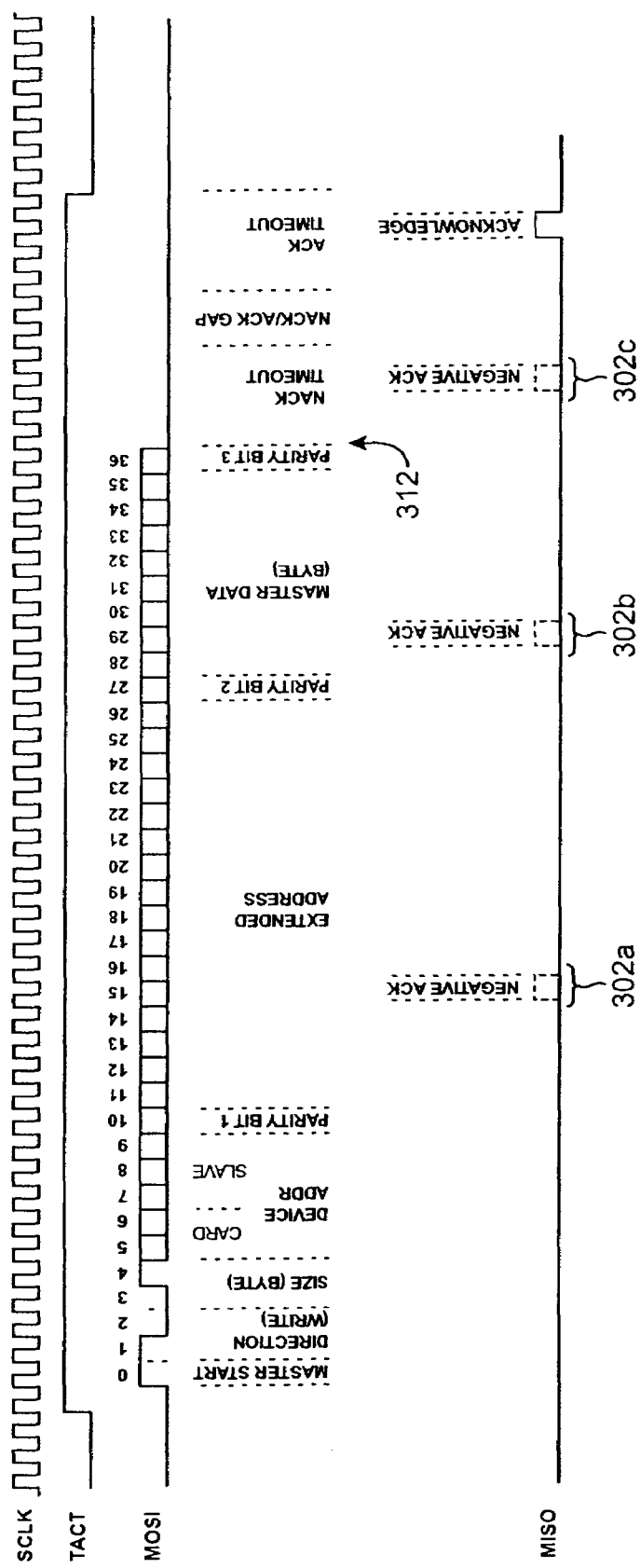
FIG. 3 shows a timing chart for a write transaction of the long format.

This is an odd parity bit covering the Master Data (in the case of a short transaction, FIG. 2), or the Extended Address field (in the case of a long transaction, FIG. 3). Detection of a parity error by a slave interface should result in issuing a NACK by the slave to the master. FIG. 3 shows in phantom three NACKs 303*a*-303*c* that can be asserted in during a long address transaction.

The parity bit is transmitted by the master device in a step 610. The position of the parity bit within the transaction sequence depends on whether the transaction is a short address transaction or a long address transaction, and the data size (Bits 4:3). In the case of a short transaction, this parity bit will be positioned at bit position 19 for an 8-bit data size. For a 16-bit data size, the parity bit position will be bit 27, and for a 32-bit data size the parity position will be bit 43. In the case of a short transaction, the "Parity bit 2" bit terminates the master portion of the transaction, shown in FIG. 2, for example, by reference numeral 212.

In long transactions, recall that the Extended Address field spans Bits 26:11. The parity bit follows the 16-bit address field, and is therefore always in bit 27 position.

Bits 59:28 or 43:28 or 35:28—Data

This field (FIG. 3) is defined for long transactions. It carries the data (step 612) when the master device determines (step 603) that the slave device is a long address device. Its length is 8, 16 or 32 bits, as indicated by the data size field (Bits 4:3).

Bit 60 or 44 or 36—Parity Bit 3

The master device transmits a parity bit (step 614) in this field in long transactions. Its position is determined by the data size (Bits 4:3), whether 8 bits, 16 bits, or 32 bits. It is an odd parity bit covering the data carried by data bits 28-59 (32 bits), bits 28-43 (16 bits), or bits 28-35 (8 bits). Detection of a parity error by a slave interface should result in issuing a NACK signal by the slave. For a long transaction, the transmission of Parity bit 3 terminates the master portion of the transaction, 312.

Write—Transmission from Slave to Master

The slave device receives the transmissions on the MOSI line (steps 616, 620, and 624). If, during transmission by the master, the addressed slave detects any errors (steps 605, 607, and 609) including parity errors or errors in the data format, it should assert a negative acknowledge (NACK) signal to the master (steps 618, 622, and 626). The slave accomplishes this by pulling the MISO line high for one clock cycle as soon as possible, but at latest within the number of clock cycles, defined as the NACK Timeout, following the end of the master's portion of the transaction. Though not shown, the master treats the NACK signal as a transaction abort request in the manner discussed above. If no errors were detected, the addressed slave must return a positive acknowledge (ACK) signal. In a particular implementation according to an embodiment of the invention, the slave waits at least a predefined number of clock cycles, called a NACK/ACK gap, after the NACK Timeout, and then pulls the MISO line high for one clock cycle.

The master expects to receive the ACK signal sent by the slave within a predefined number of clock cycles, called the ACK Timeout, which follows the NACK Timeout and the subsequent NACK/ACK gap. Lack of an acknowledge signal within this time indicates no functional slave present at the addressed location.

Error detection is enhanced by having multiple parity bits in the same transaction. The slave device can check each parity bit (Parity bit 1 checked at step 605, Parity bit 2 checked at step 607, and Parity bit 3 checked at step 609), and as soon as a parity error is detected, the slave device can signal the master device accordingly (steps 618, 622, and 626), thus providing for quicker error detection and consequently more timely error recovery by the master device.

Read Transaction

During a read transaction, on command from the master, the slave sends data from its addressed register to the master. As discussed earlier in the Start of Transaction section, the first eleven bits of all transactions are always sent by the master on the MOSI line. The format of these eleven bits is always the same. For the read transaction, Bits 2:1 indicating the direction of data transfer carry the binary value of 01.

If the short address read transaction is used, the master portion of the read transaction ends with the Parity bit 1 (bit 10 of the transaction) and the NACK Timeout begins. If the long address read transaction is used, sixteen bits of extended address and the Parity bit 2 (bits 11 through 27 of the transaction) follow the Parity bit 1. After that, the NACK Timeout begins.

As discussed above, if, during the master portion of the transaction, the addressed slave detects any errors in data format, value, or parity the slave should send a negative acknowledge signal to the master, as soon as possible but, at latest, within the NACK Timeout following the end of the master's portion. The slave does it by pulling the MISO line high for one clock cycle. The master treats the signal as a transaction abort request.

If no errors were detected, the addressed slave must wait after the master ends its portion of the transaction for at least the number of clock cycles defined as the NACK/ACK gap, and then start sending the requested data to the master. The master expects the slave response to begin within a predefined, limited time. Start of the response indicates positive acknowledge (ACK) by the slave of successful reception of the master's portion. Lack of response within this time indicates no functional slave present at the addressed location.

The slave starts its response by driving the MISO line high for one clock period. This constitutes the Slave Start bit which is followed immediately by slave data (see FIGS. 4 and 5). The master must wait until it sees the Slave Start bit before clocking the slave's data into its own registers.

Read, Short Transaction—Transmission from Slave to Master

Figure 4:
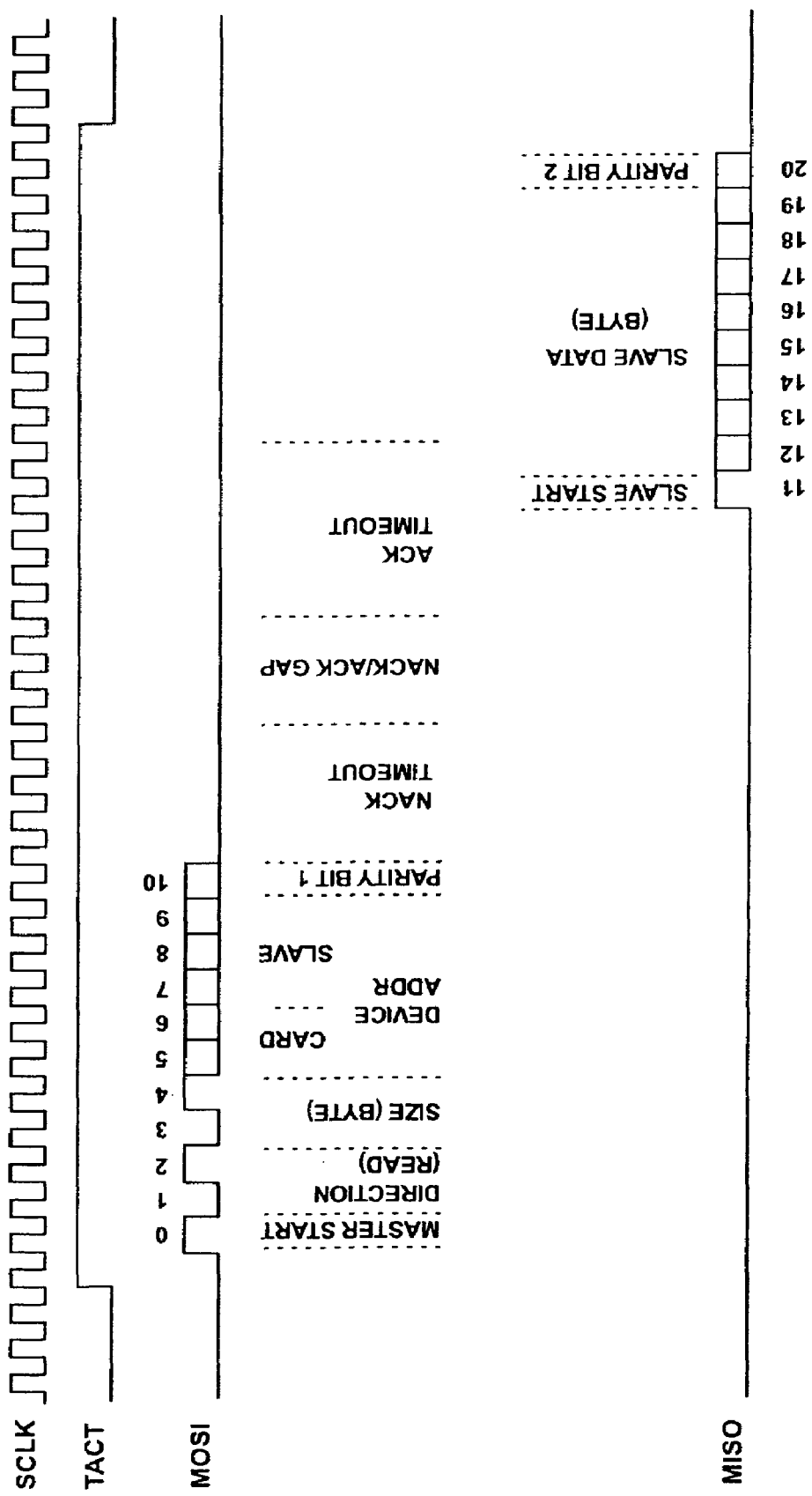
FIG. 4 shows a timing chart for a read transaction of the short format.

FIG. 4 shows the timing chart for a short transaction read operation. The first eleven bits are sent by the master device during the master portion of the read transaction, as discussed above. This is shown in the flow diagram of FIG. 7. Thus, in a step 702 a slave device address is transmitted on the MOSI line. In a step 704, the Parity bit 1 is transmitted. As in the write transaction, an early detection of a communication error can be performed (step 705) by checking Parity bit 1 and asserting a NACK in a step 714 by the slave.

If the slave is a long address device (step 701), then in a step 706 the Extended Address field is transmitted, followed by Parity bit 2 in a step 708. The Parity bit 2 allows for early detection of a communication error in a step 709, followed by assertion of a NACK in a step 718 if an error is detected.

In addition, the direction bits (Bits 2:1) indicate a read transaction. As with the write transaction, the device address is sent as Bits 9:5 for short transactions.

The master device, during transmission to the slave, monitors for a NACK on the MISO line and performs error handling as discussed above when a NACK is detected.

Bit 11—Slave Start Bit

After the slave address bits have been sent, and both the NACK Timeout and the NACK/ACK gap have expired, the slave drives the MISO line high in a step 720 for one clock period to indicate the start of the slave portion of the transaction. The master device then receives the data sent by the slave device in a step 710.

Bits 43:12 or 27:12 or 19:12—Data

This field carries data transmitted by the slave device in a step 722. Its length is 8, 16 or 32 bits, as requested by the data size field (Bit 4:3) that had been sent during the master portion of the transaction.

Bit 44 or 28 or 20—Parity Bit 2

This bit position is for the Parity bit 2 transmitted by the slave device in a step 724. This in an odd parity bit covering the data carried by bits 12-19, bits 12-27, or bits 12-43. Detection of a parity error by the master interface logic (step 703) should result in issuing an interrupt by the master to the CPU controlling the master interface to perform some appropriate error handling (step 712). The interrupt cause should be represented in the contents of an interrupt cause register. This bit represents the end of the slave portion of the transaction. As can be expected, its actual position depends on the data size.

Read, Long Transaction

Figure 5:
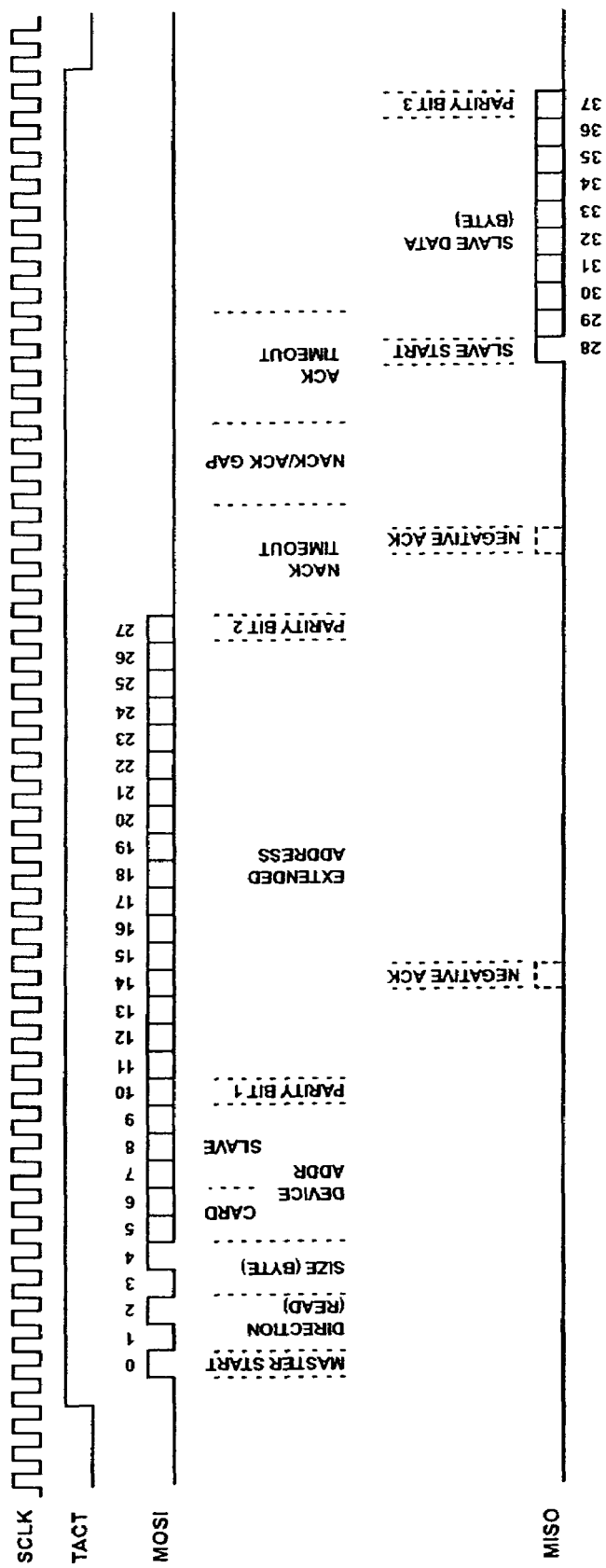
FIG. 5 shows a timing chart for a read transaction of the long format.

FIG. 5 shows a long transaction format. The first eleven bits are sent by the master device during the master portion of the read transaction, as discussed above. Here, the direction bits (Bits 2:1) indicate a read transaction. As with the write transaction, the device address is sent as Bits 9:5 and Bits 26:11 for long transactions. It is noted that the parity bits 1, and 2 can be used for early detection of communication error, in the same manner as described above for a write transaction.

Bit 28—Slave Start Bit (Step 720)

As with the short address read transaction, after the master completes its portion with Parity bit 2, and both, the NACK Timeout and the NACK/ACK gap expire, the slave drives the MISO line high for one clock period to indicate acknowledgment of successful reception of the master's portion and the start of the slave portion of the transaction.

Bits 60:29 or 44:29 or 36:29—Data (Step 722)

This field carries data from the slave device. Its length is 8, 16 or 32 bits, as indicated by the data size field.

Bit 61 or 45 or 37—Parity Bit 3 (Step 724)

The position of this field depends on the data size. The parity bit is an odd parity bit covering the data carried by bits 12-36, bits 12-44, or bits 12-60. Detection of a parity error by a master interface should result in issuing an interrupt by the master to the CPU controlling the master interface. This interrupt cause should be represented in the contents of an interrupt cause register. This bit ends the transaction.

What is claimed is:

1. A serial data communication system comprising:
a master device having a master bus interface that is configured for connection to a data bus, the data bus having a first data communication path and a second data communication path;
the master bus interface operable to transmit a data stream on the first data communication path comprising:
address information representative of a receiving device;
first error checking information suitable for detecting the occurrence of an error in the address information;
a data portion to be received by the receiving device; and
second error checking information suitable for detecting the occurrence of an error in the data portion,
the master bus interface further operable to monitor the second data communication path for an error indication during transmission of the data stream,
the master bus interface operable to cease transmission of the data stream in response to detecting an error indication.

2. The serial communication system of claim 1 wherein the address information further comprises a first address portion and a second address portion, and third error checking information occurring in the data stream between the first address portion and the second address portion, the third error checking information suitable to detect the occurrence of an error in the first address portion, the first error checking information suitable to detect the occurrence of an error in the second address portion.

3. The serial communication system of claim 1 further comprising a slave device having a slave bus interface and a first data bus coupled between the master bus interface and the slave bus interface, the slave bus interface operable to determine an error condition based on the address information and the first error checking information, or based on the data portion and the second error checking information, the slave bus interface operable to transmit the error indication in response to detecting an error condition.

4. The serial communication system of claim 1 further comprising:
a repeater device having at least a first repeater bus interface and a second repeater bus interface;
a first data bus connected between the master bus interface and the first repeater bus interface;
at least one slave device having a slave bus interface; and
a second data bus connected between the second repeater bus interface and the slave bus interface,
the repeater device operable to transmit information received at its first repeater bus interface to its second repeater bus interface and vice-versa to provide data communication between the master device and the at least one slave device.

5. The serial communication system of claim 4 wherein the repeater device includes a third repeater bus interface, the system further including a second slave device having a second slave bus interface, and a third bus coupled between the third repeater bus interface of the repeater device and the second slave bus interface, wherein the repeater device is further operable to transmit the information received at its first repeater bus interface to its third repeater bus interface and vice-versa.

6. The serial communication system of claim 4 wherein the first repeater bus interface is a slave bus interface so that the master device appears to be connected to a slave device and the second repeater bus interface is a master bus interface so that the slave device appears to be connected to a master device.

7. The serial communication system of claim 1 wherein the address information is representative of more than one receiving device.

8. A serial data communication system comprising:
a master device having a bus interface, wherein the bus interface is operable to transmit a data stream on its serial data bus comprising:
address information representative of at least one of the slave devices;
first error checking information suitable for detecting the occurrence of an error in the address information;
data portion; and
second error checking information suitable for detecting the occurrence of an error in the data portion,
the bus interface of the master device further operable to monitor its serial data bus for an error indication during transmission of the data stream,
the bus interface of the master device further operable to cease transmission of the data stream in response to detecting an error indication;
a plurality of slave devices, each having a bus interface;
a repeater device having a plurality of bus interfaces; and
a plurality of serial data buses, each serial data bus coupled between a bus interface of the repeater device and the bus interface of either the master device or of one of the slave devices,
the repeater device operable to transmit information received from the master device to each of the slave devices,
the repeater device further operable to transmit information received from the slave devices to the master device.

9. The serial data communication system of claim 8 wherein the address information further comprises a first address portion and a second address portion, and third error checking information disposed in the data stream between the first address portion and the second address portion, the third error checking information suitable to detect the occurrence of an error in the first address portion, the first error checking information suitable to detect the occurrence of an error in the second address portion.

10. The serial data communication system of claim 8, wherein the address information is representative of more than one of the slave devices.

11. A serial data communication system comprising:
a master device;
at least one slave device; and
means for providing a point-to-point connection between the master device and the at least one slave device,
the master device comprising means for transmitting a data stream to the at least one slave device, the data stream comprising:
address data representative of the at least one slave device;
first error checking information suitable for detecting the occurrence of an error in the address information;
a data portion; and
second error checking information suitable for detecting the occurrence of an error in the data portion,
the at least one slave device comprising means for determining an error based on the address data and the first error checking information or on the data portion and second error checking information.

12. The system of claim 11 wherein the means for providing a point-to-point connection includes a first bus interface in the master device, a second bus interface in the at least one slave device, and a serial data bus coupled between the first bus interface and the second bus interface.

13. The system of claim 11 wherein the means for providing a point-to-point connection includes a repeater device having a point-to-point connection with the master device and a point-to-point connection with the at least one slave device, the repeater device operable to transmit information received from the master device to the at least one slave device.

14. The system of claim 13 further including a second slave device, the second slave device having a point-to-point connection with the repeater device.

* * * * *